(No Model.)
H. S. MOORE.
CULTIVATOR.
No. 456,050. Patented July 14, 1891.
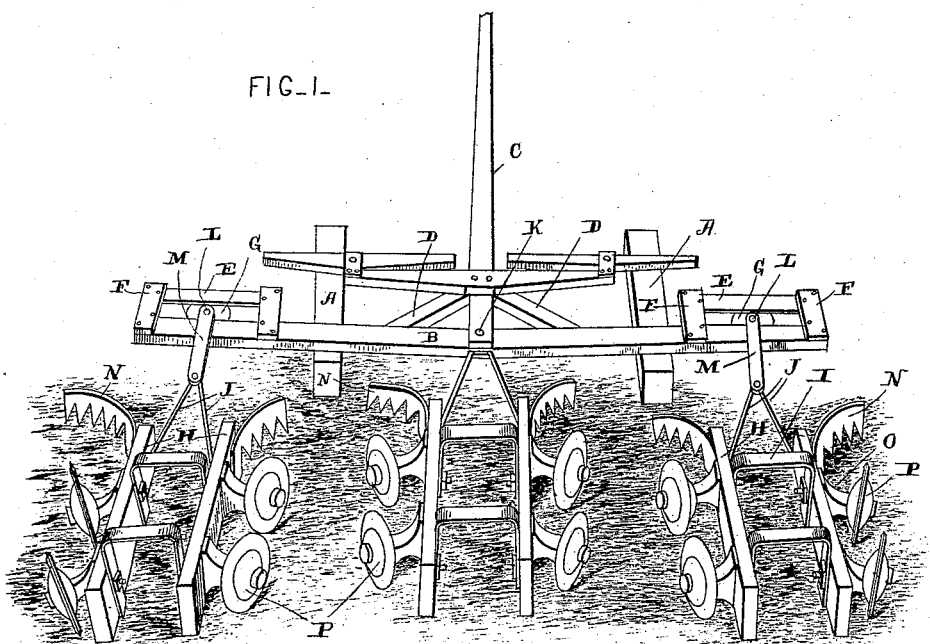
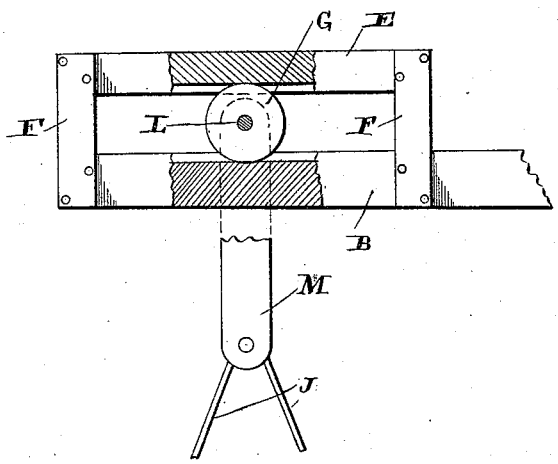
WITNESSES
Geo. E. Truck.
Roland H. Fitzgerald
INVENTOR
H. S. Moore,
per
Lehmann & Pattison,
attys.

UNITED STATES PATENT OFFICE.

HARRISON S. MOORE, OF DU BOIS, NEBRASKA.

CULTIVATOR.

SPECIFICATION forming part of Letters Patent No. 456,050, dated July 14, 1891.

Application filed April 23, 1891. Serial No. 390,119. (No model.)

*To all whom it may concern:*

Be it known that I, HARRISON S. MOORE, of Du Bois, in the county of Pawnee and State of Nebraska, have invented certain new and useful Improvements in Cultivators; and I do hereby declare the following to be a full, clear, and exact description of the invention, such as will enable others skilled in the art to which it pertains to make and use it, reference being had to the accompanying drawings, which form part of this specification.

My invention relates to an improvement in cultivators; and it consists in the construction and arrangement of parts which will be fully described hereinafter, and referred to in the claims.

The object of my invention is to provide a cultivator which will plow and harrow several rows of corn or other plants at the same time and to make the several parts of the cultivator automatically adjustable, so as to accommodate themselves to rows of different widths or distances apart or to follow crooked rows without in any manner damaging the plants.
Figure 1 is a perspective view of a machine which embodies my invention. Fig. 2 is a detached view showing the manner of adjusting the roller or plowing disks.

The frame of my machine consists of the runners A, to the upper rear ends of which is connected a transverse horizontal beam B, and connected to this beam B, between the two runners, is the tongue C, which carries the doubletrees, as shown. The inner end of the tongue C is braced by means of the braces D, which have their ends connected, respectively, to the tongue and the beam B. Supported in front of the beam B, at its ends and outside of the runners A, are the short beams E, by means of the bars F. The inner faces of the short beams E and the adjacent inner face of the outer ends of the beam B form a guideway for rollers G, which are placed between them and move back and forth for the purpose to be hereinafter described.

The cultivators consist of the two runners H, which form shields or fenders to prevent the plowed earth from being thrown or rolled over the plants, and these fenders are connected at their ends by means of the arches I, under which the plants being cultivated pass. Connected to the forward ends of the fenders H are the two rods J, which have their opposite ends connected with the beam B. The front ends of the rods J of the central cultivator pass into a recess or opening made in the beam B and are held in place by means of a vertical bolt K, around which the rods pass.

Connected at their front ends to the spindles L of the rollers or wheels G, above and below the said wheels, are the bars M, which have their opposite ends connected with the front ends of the bars J of the side cultivators. By means of this construction the rollers move back and forth between the beams B and E and allow the side cultivators to automatically adjust themselves to rows of different widths and to follow crooked rows without running into the plants and injuring them.

Connected to the front ends of the fenders H are the forwardly-extending and outwardly-curved toothed arms N, which reach to or nearly to the center of the ridge, so as to harrow the ground as the cultivator is moved along. Extending outward and rearward at an angle from the fenders H are the arms O, to the outer ends of which are journaled the rotary disks P in any suitable manner. These disks, owing to the angle at which they are set, plow and cultivate the soil between the rows, as will be readily understood. The inner ends of these arms O are connected to the fenders in a manner which will allow them to be moved up and down, so that the depth at which they shall run can be regulated, and they are firmly held in this adjusted position by means of their clamping-bolts.

From the above description it will be seen that I construct a cultivator which will adapt itself automatically to rows of different widths and follow crooked rows and at the same time plow and harrow the earth without in any manner injuring the plants.

Having thus described my invention, I claim—

1. In a cultivator, a frame having a horizontal guideway at each side, a sliding device within the guideway, a cultivator connected with the frame between the guideways, which has no lateral movement, a cultivator at each side of the central cultivator, and a connection between the side cultivators and the sliding device, the parts combined substantially as shown.

2. In a cultivator, a frame, a cultivator connected with the frame between its ends, which has no lateral movement, a cultivator at each side of the central cultivator, and connections between the side cultivators and the frame, which is constructed and arranged to move laterally upon the frame to allow the side cultivators to automatically adjust themselves to rows of different widths and to follow crooked rows, substantially as specified.

3. In a cultivator consisting of the side boards which form fenders, arches connecting the fenders, arms extending outward from the fenders carrying revolving disks, and forwardly-extending and outwardly-curved toothed arms, the parts combined substantially as shown.

In testimony whereof I affix my signature in presence of two witnesses.

H. S. MOORE.

Witnesses:
A. W. MALLORY,
L. M. WILSEY.